(No Model.)
C. SWEARINGEN & D. S. LEMEN.
BICYCLE ALARM.
No. 573,555. Patented Dec. 22, 1896.
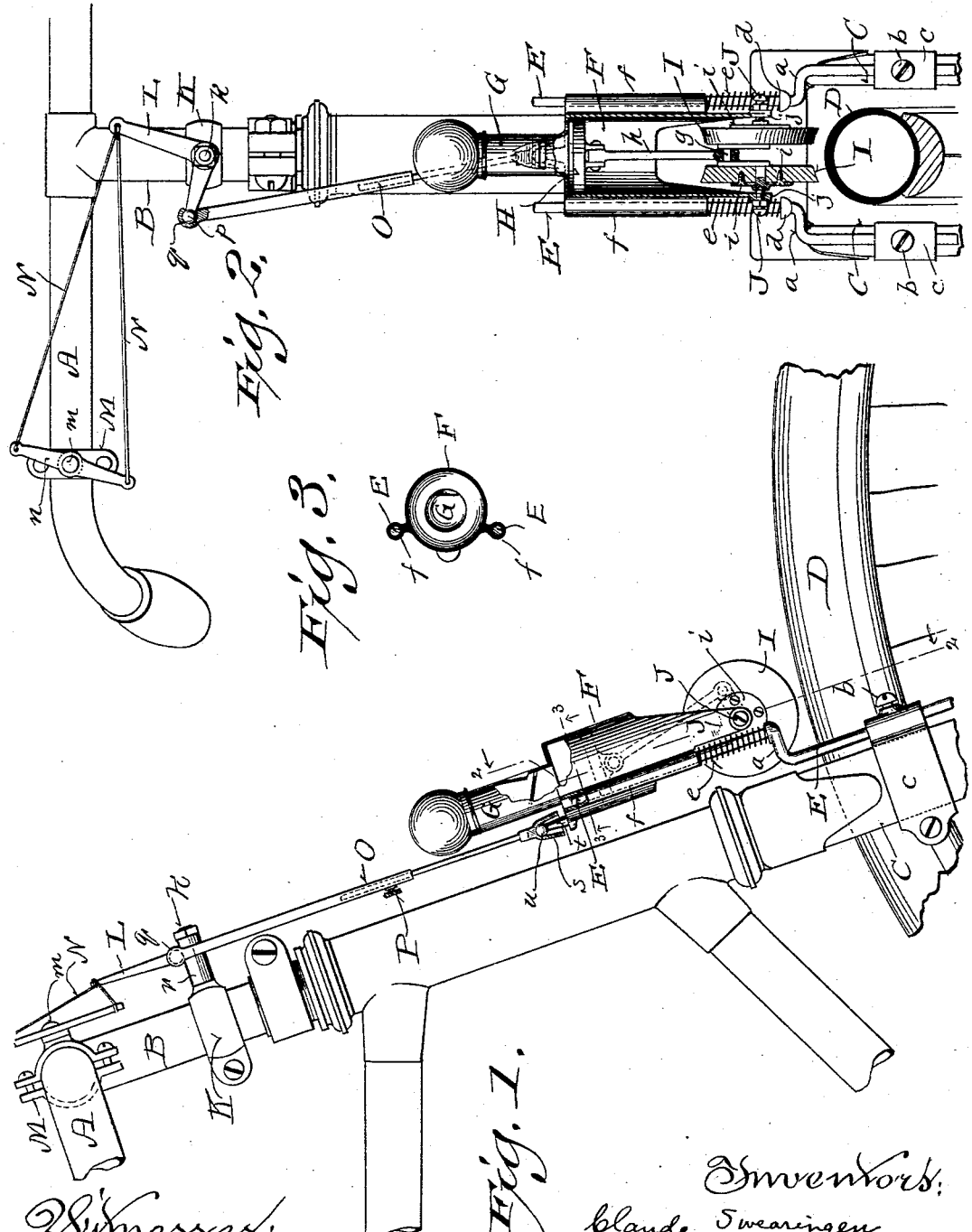
Witnesses:
Geo. W. Young
C. H. Scott
Inventors:
Claude Swearingen
David S. Lemen
By H. G. Underwood
C. H. Corners

UNITED STATES PATENT OFFICE.

CLAUDE SWEARINGEN AND DAVID S. LEMEN, OF MILWAUKEE, WISCONSIN

BICYCLE-ALARM.

SPECIFICATION forming part of Letters Patent No. 573,555, dated December 22, 1896.

Application filed September 2, 1896. Serial No. 604,598. (No model.)

*To all whom it may concern:*

Be it known that we, CLAUDE SWEARINGEN and DAVID S. LEMEN, citizens of the United States, and residents of Milwaukee, in the county of Milwaukee and State of Wisconsin, have invented certain new and useful Improvements in Alarms or Signals for Bicycles; and we do hereby declare that the following is a full, clear, and exact description thereof.

Our invention relates to a whistle to be used as an alarm or signal by riders of bicycles and to be operated by the revolving tire; and it consists in certain peculiarities of construction and combination of parts, as will be fully set forth hereinafter and subsequently claimed.

In the drawings, Figure 1 is a side elevation of our device applied to a bicycle and ready for use, showing portions partly broken away or in section to better illustrate certain details of construction. Fig. 2 is a front elevation of the parts shown in Fig. 1 and partly in section on the line 2 2 in said figure. Fig. 3 is a transverse sectional view on the line 3 3 of Fig. 1.

Referring to the drawings, A represents the handle-bar, B the handle-bar post, C C the fork sides, and D the pneumatic tire of the front wheel, of a bicycle of any ordinary construction. E E are vertical supporting rods or wires, preferably formed with angular bends $a$ therein and with their lower ends adjustably held, as by set-screws $b$ in clips $c\ c$, secured to the fork sides C C. These rods E may have collars, sleeves, or buttons $d$ thereon just above the described angular bends, and are there fitted with spiral springs $e\ e$.

F designates the cylinder of our device, which has vertical exterior tubular guides $f\ f$ for the reception of the upper ends of the supporting-rods E E, the said tubular guides resting on top of the springs $e\ e$.

G is a whistle of any approved construction whose barrel communicates with the top of the cylinder F. H is the piston, movable in the said cylinder.

I I are friction wheels or disks united by a double crank-arm $g$, rigid with said wheels, the piston H being connected to said crank-arm by a link $h$, as shown, said wheels or disks having preferably beveled peripheries. On the outer sides of said wheels are secured bearing-plates $i\ i$ with central seats for the reception of the pointed ends of the pivot-screws J J, which pass through flanges $j\ j$, depending from the cylinder F.

K is a clip on the handle-bar post B, and $k$ a stud projecting from said clip, on which stud a bell-crank lever L is mounted, the said lever having, preferably, a tubular hub $r$, as shown. M is another clip on the handle-bar A, having a stud $m$ projecting therefrom on which is centrally mounted a lever $n$, and a cord, wire, or chain N connects the end of the upper arm of the bell-crank lever L with both ends of the lever $n$. The lower arm of the bell-crank lever L is loosely jointed to the upper end of a rod O, preferably by a ball $p$ on the end of the lever-arm and a socket $q$ on the end of the rod O. The lower end of the rod O has a preferably conical seat or socket $s$ therein to receive a post $t$, rising from the top of the cylinder F, and having, preferably, a ball $u$ at its upper end.

The operation of our device will be readily understood from the foregoing description of its construction, taken in connection with the accompanying drawings.

In order to sound the alarm or signal, it is only necessary for the person riding the bicycle to move or draw the lever $n$ or cord N. This will serve to pull the upper arm of the bell-crank lever L over toward the lever $n$ and depress the outer end of the lower arm of lever L, and with it the rod O, thereby forcing the cylinder F downward on its supporting-rods E E against the force of the springs $e\ e$ and causing the wheels or disks I I to impinge on the tire D of the revolving front wheel and to be thereby themselves rapidly revolved, the ensuing reciprocation of the piston H within the cylinder F forcing intermittent blasts of air through the whistle G, resulting in a series or succession of short loud whistles constituting the alarm or signal referred to and which will continue as long as the wheels or disks are in contact with the rapidly-revolving tire. The moment the lever $n$ or cord N is released the springs $e\ e$ will serve to automatically raise the cylinder F on the rods E E, thus carrying the wheels or disks I I out of contact with the tire D, and the whistle becomes mute.

In order that our device may be adapted to different makes of bicycles, where there are differences in the length of the steering-heads, the described rod O is preferably made in sections, so as to be extensible, and we have shown a preferred construction wherein one part of said rod telescopes within the other part and is held to the required adjustment by a set-screw P.

Having thus described our invention, what we claim as new, and desire to secure by Letters Patent, is—

1. An alarm or signal for bicycles, comprising supporting-rods adapted to be secured to the fork sides of a bicycle, springs on said rods, an open-bottomed cylinder vertically movable on said rods above said springs, a piston movable within said cylinder, friction-wheels journaled directly in the side walls of said cylinder, and cranked to said piston, and adapted to be suspended over the bicycle-tire, a whistle connected to said cylinder, a post rising from the top of said cylinder, and a cylinder-depressing device adapted to be secured to said bicycle and bearing against said post, but free from connection with said cylinder or post.

2. An alarm or signal for bicycles, comprising supporting-rods adapted to be secured to the fork sides of a bicycle and bent inward and then upward, springs on the upper vertical portions of said rods, an open-bottomed cylinder having vertical exterior tubular guides mounted on said rods above said springs, a post rising from the top of said cylinder, a whistle also rising from the top of said cylinder, a piston movable within said cylinder, a pair of friction-wheels journaled directly in the side walls of said cylinder and rigidly united by a double crank-arm, a link connecting said crank-arm to the piston, and a cylinder-depressing device adapted to be secured to the bicycle and bearing against the post on the cylinder but free from attachment thereto.

3. An alarm or signal for bicycles, comprising clips adapted to be secured to the fork sides, supporting-rods adjustably secured to said clips and bent inward above the point of attachment to the clips and then upward, springs on the upper vertical portions of said rods, an open-bottomed cylinder having vertical exterior tubular guides mounted on said rods above said springs, a post rising from the top of said cylinder, a whistle connected to said cylinder, a piston movable within said cylinder, friction-wheels journaled directly in the side walls of said cylinder and cranked to said piston, a handle-bar-post clip having a stud projecting therefrom, a bell-crank lever mounted on said stud, a handle-bar clip having a stud projecting therefrom, a lever centrally mounted on said stud, a cord, wire or chain connecting both arms of said last-named lever with one arm of the bell-crank lever, and an adjustable rod loosely jointed at its upper end to the other arm of the bell-crank lever and having a socket at its lower end for the reception of the post on said cylinder.

4. An alarm or signal for bicycles, comprising an open-bottomed cylinder, a whistle connected thereto, a piston movable within said cylinder, a friction-wheel journaled directly in the side walls of said cylinder and cranked to said piston, a rod for depressing the cylinder to cause the engagement of the friction-wheel with the bicycle-tire but free from attachment to said cylinder, and spring-rods supporting said cylinder and permitting vertical movement thereof independently of the movement caused by said depressing-rod.

In testimony that we claim the foregoing we have hereunto set our hands, at Milwaukee, in the county of Milwaukee and State of Wisconsin, in the presence of two witnesses.

CLAUDE SWEARINGEN.
DAVID S. LEMEN.

Witnesses:
H. G. UNDERWOOD,
B. C. ROLOFF.